(12) United States Patent
Wade et al.

(10) Patent No.: US 6,605,879 B2
(45) Date of Patent: Aug. 12, 2003

(54) BATTERY CHARGER CONTROL CIRCUIT AND AN UNINTERRUPTIBLE POWER SUPPLY UTILIZING SAME

(75) Inventors: Joseph R. Wade, Mindoro, WI (US); Glenn A. Koosmann, Port Edwards, WI (US); Donald K. Zahrte, Sr., Necedah, WI (US)

(73) Assignee: Powerware Corporation, Raleigh, NC (US)

( * ) Notice: Subject to any disclaimer, the term of this patent is extended or adjusted under 35 U.S.C. 154(b) by 43 days.

(21) Appl. No.: 09/838,369

(22) Filed: Apr. 19, 2001

(65) Prior Publication Data

US 2002/0153779 A1 Oct. 24, 2002

(51) Int. Cl.[7] .................................................. H02J 7/00
(52) U.S. Cl. ........................................ 307/66; 363/37
(58) Field of Search ....................... 307/64, 66; 363/34, 363/37; 320/134

(56) References Cited

U.S. PATENT DOCUMENTS

| | | | | |
|---|---|---|---|---|
| 4,761,726 A | * | 8/1988 | Brown | 363/51 |
| 5,047,961 A | * | 9/1991 | Simonsen | 702/63 |
| 5,465,011 A | * | 11/1995 | Miller et al. | 307/64 |
| 5,576,941 A | * | 11/1996 | Nguyen et al. | 363/133 |
| 5,747,887 A | * | 5/1998 | Takanaga et al. | 307/64 |
| 5,978,236 A | * | 11/1999 | Faberman et al. | 307/66 |
| 5,982,652 A | * | 11/1999 | Simonelli et al. | 307/26 |
| 6,031,737 A | * | 2/2000 | Green | 363/37 |
| 6,031,738 A | * | 2/2000 | Lipo et al. | 363/37 |
| 6,115,276 A | * | 9/2000 | Mao | 363/127 |
| 6,121,695 A | * | 9/2000 | Loh | 307/64 |
| 6,160,722 A | * | 12/2000 | Thommes et al. | 363/37 |
| 6,169,669 B1 | * | 1/2001 | Choudhury | 307/66 |
| 6,172,481 B1 | * | 1/2001 | Curtiss | 320/127 |
| 6,285,223 B1 | * | 9/2001 | Smith | 327/143 |
| 6,292,379 B1 | * | 9/2001 | Edevold et al. | 307/66 |
| 6,295,215 B1 | * | 9/2001 | Faria et al. | 363/37 |
| 6,310,783 B1 | * | 10/2001 | Winch et al. | 361/683 |
| 6,311,279 B1 | * | 10/2001 | Nguyen | 713/300 |

* cited by examiner

*Primary Examiner*—Brian Sircus
*Assistant Examiner*—Sharon A. Polk
(74) *Attorney, Agent, or Firm*—Leydig, Voit & Mayer, Ltd.

(57) ABSTRACT

A charging control circuit for severe battery conditions and an uninterruptible power supply (UPS) system including same are presented. The charging control circuit utilizes both hardware and microprocessor control to allow the UPS to start with depleted or no batteries installed. Initially, the hardware control loops regulate DC bus voltage generation to charge the batteries to a safe level to allow the UPS housekeeping circuitry to wake up and assume control of the UPS operation. Once the microprocessor has awoken, it assumes control of the DC bus and charging of the batteries. If no batteries are installed, the hardware control loop utilizes a fast responding voltage mode control to regulate the DC bus, while a microprocessor-based current mode control is used when batteries are installed. Hardware over voltage control and microprocessor shut off control is also provided.

23 Claims, 4 Drawing Sheets

BATTERY CHARGER CONTROL CIRCUIT AND AN UNINTERRUPTIBLE POWER SUPPLY UTILIZING SAME

FIELD OF THE INVENTION

The present invention relates generally to battery charging control circuits, and more particularly relates to battery charging control circuits in uninterruptible power supply (UPS) systems.

BACKGROUND OF THE INVENTION

As more and more segments of the business environment enter the information age, more and more computers and computing power are required. As businesses move from the old to the new economy their reliance on the processing, transference, and storage of digital information is becoming a more and more critical aspect of their overall business strategy. While in the past, computer crashes were seen as a mere nuisance, the loss of computing power and business data may well devastate a business's ability to survive in today's new economy. As such, the need for reliable, uninterruptible electric power to maintain the operational status of the computing equipment and the integrity of the digital data continues to rise.

To meet these requirements, uninterruptible power supplies (UPS) have been developed. These UPSs utilize a bank of electric storage batteries and solid state conversion and charging equipment to provide continuous electric power to a business's computer systems in the event of a loss of power from the utility or a deviation from the normal regulated utility specifications. The number of batteries contained within an UPS is dependent upon the business's length of time and its needs to operate in the event of a utility power system failure. Further, the number of power inverters required to supply the total load demand of a business also controls the size and number of inverters necessary in the UPS. The number of battery chargers is also somewhat dependent on these factors and the business's requirement for the speed at which discharged batteries are required to come back online.

Since each of these parameters are dependent upon the particular make-up, structure, and operational requirements of different businesses, the provision of any single UPS configuration will likely only completely meet the needs of a small segment of the overall business environment. As such, modular uninterruptible power supplies have been developed that allow, to some extent, the ability to reconfigure an UPS based upon the actual requirements of any particular business. For businesses that have only a small power output requirement but with a corresponding long duration need, their modular UPS may be configured with multiple battery banks and only a single inverter. Another business may have a larger power draw requirement necessitating the inclusion of multiple inverters.

Indeed, the particular requirements of any single business may change depending on the nature of their business. For example, while a business may have a short term high power requirement of its UPS, business operating procedures may dictate that non-essential computing equipment be taken off-line as it appears that a power failure may last an extended period of time. In such a situation, additional power inverters required during the short term power losses may then be replaced with additional battery banks to provide a long term power supply to critical computing equipment during the power outage event.

While an UPS will allow continued operation of the utilization equipment during a power loss, if this power loss lasts for an extended period of time the batteries of the UPS will become depleted. Once this has occurred, both the UPS and the utilization equipment will be shut down due to a lack of power. If the batteries become completely depleted, if batteries that have not been charged are installed in the UPS, or if the batteries are removed from the UPS, the UPS will be unable to resume or start operation when the main line power is restored. This is because typical UPS's require that their housekeeping circuitry be powered to operate. Since the typical UPS derives the power for the housekeeping circuitry from the batteries, this circuitry cannot operate when the batteries are discharged or missing.

To overcome this problem, prior UPS's require that fresh batteries be installed, or that an external battery charger be used to charge the depleted batteries before the UPS can resume operation. Until one of these is accomplished, the utilization equipment cannot be used, unless the UPS is taken out of the circuit and the utilization equipment is connected directly to the incoming line voltage. Once the batteries are charged, the utilization equipment must then be disconnected from the main line voltage and reconnected to the UPS in order to be protected from the future power outages. Not only is this manual reconfiguration of power lines is time consuming and unproductive, but it also requires that the very equipment that is meant to be protected from power outages must be de-powered to be reconnected to the UPS once it is again ready to operate. This greatly reduces the user experience of such systems.

BRIEF SUMMARY OF THE INVENTION

In view of the above, it is therefore and object of the present invention to provide a new and improved battery charger circuit for an uninterruptible power supply (UPS) system. More particularly, it is an object of the present invention to provide a new and improved battery charger circuit for an UPS system that is capable of starting the UPS with severely depleted batteries. It is a further object of the invention to provide a battery charger circuit that is capable of starting a UPS with no batteries installed. Preferably, this functionality is achieved without any control from the main battery charger control circuitry. Further, this functionality is achieved in a safe manner avoiding any overcharging of the batteries.

In one embodiment of the present invention, the battery charger circuit is operational when the main AC line power is restored or coupled to the UPS system. The circuit of the present invention charges the severely depleted batteries that are at or near 0 volts DC in a short time to a level where the housekeeping circuitry of the UPS can wake up to allow operation of the UPS. Additionally, if no batteries are installed in the UPS, the circuitry of the present invention charges the battery bus to a safe level to allow the housekeeping circuitry to wake up. This ability to maintain the battery bus voltage without batteries installed enables hot swapping of the batteries without taking the UPS off-line.

Operation of an embodiment of the battery charger circuitry of the present invention begins and may continue without functioning of the main battery charger control. During such a situation, the circuitry of the present invention will charge the batteries to near full capacity by limiting the voltage so that the batteries are not overcharged. Likewise, the circuitry of the present invention will regulate the battery bus voltage to maintain the housekeeping circuitry without the main control being operational. When the main UPS control becomes functional, the circuitry of the present invention will yield control of the battery charging and maintenance.

In one embodiment of the present invention, the modular UPS includes a number of power modules that are capable of supplying output AC power from either the input AC mains or from the battery. Each of the power modules in this embodiment include battery charging circuitry, including the circuitry of the present invention. This circuitry may be paralleled with the circuitry from the other power modules to charge the batteries and maintain the battery bus. This circuitry contains fail-safe circuitry to ensure that a failure in any one of the power modules will not overcharge the batteries or bring the battery bus down.

In a preferred embodiment an uninterruptible power supply (UPS) system comprises a power module having an input adapted to receive AC mains power, and an output adapted to supply AC power to utilization equipment. The power module has an input controlled rectifier adapted to generate a DC voltage on an internal DC bus, and a power inverter coupled to the internal DC bus for generating the AC power on the output. The power module includes a hardware control circuit having a control loop adapted to control the input controlled rectifier to regulate the DC voltage on the internal DC bus at a safe level below a normal controlled level. Preferably, the power module further comprises a microprocessor control circuit operatively coupled to the hardware control circuit to control the DC voltage on the internal DC bus at the normal controlled level. The microprocessor control circuit provides a variable duty cycle control signal to the hardware control circuit. In this way, the microprocessor adjusts a duty cycle of the variable duty cycle control signal to vary the DC voltage on the internal DC bus. In one embodiment, the hardware control circuit controls the DC voltage at the first safe level when the duty cycle of the variable duty cycle control signal is less than approximately 10%, at a second level above the normal controlled level when the duty cycle of the variable duty cycle control signal is greater than approximately 10%, and at a level between the first safe level and the second level when the duty cycle of the variable duty cycle control signal is between approximately 10% and 75%. At a duty cycle of greater than approximately 75%, the converters are shut down.

The UPS system preferably further includes a slot adapted to receive a battery. In this embodiment, the microprocessor commands the hardware control circuit to control the DC voltage at the second level above the normal controlled level when no battery is present in the slot. When a battery is selectively coupled to the input of the controlled rectifier and to the internal DC bus, the microprocessor commands the hardware control circuit to control the DC voltage at the normal controlled level to charge the battery. The microprocessor control circuit commands the hardware control circuit to control the DC voltage to a second level above the normal controlled level upon removal of the battery. In one embodiment the hardware control circuit includes a second control loop operative to control the DC voltage below a maximum level.

In an embodiment that further comprising a battery selectively coupled to the input of the controlled rectifier and to the internal DC bus, the hardware control circuit is operative to control the DC voltage at the first safe level to charge the battery until the microprocessor wakes up. Thereafter, the microprocessor controls the hardware control circuit to control the DC voltage at the normal controlled level to charge the battery. Further, the microprocessor commands the hardware control circuit to control the DC voltage at a second level upon removal of the battery. In one embodiment the UPS system further comprises a kick-start circuit operative upon initial application of AC mains power to start the input controlled rectifier.

In an alternate embodiment of the present invention, a battery charger control circuit for use in an uninterruptible power supply (UPS) is presented. The UPS includes an input controlled rectifier adapted to supply DC power to an internal DC bus for use by a power inverter to generate output AC power. This input controlled rectifier selectively utilizes AC mains power and battery power to supply the DC power to the internal DC bus. The battery is coupled to the DC bus to receive charging power when it is not selectively coupled to the input controlled rectifier to supply power to the UPS. This circuit includes a hardware control circuit that is coupled to the input controlled rectifier to control a DC voltage. Also included is a microprocessor control circuit that receives power from the internal DC bus. This microprocessor control circuit is operatively coupled to the hardware control circuit to command the hardware control circuit to control the DC voltage from the input controlled rectifier at a controlled level. The hardware control circuit includes a control loop having a target voltage below the controlled level. This hardware control circuit controls the DC voltage to this level when the microprocessor control circuit is not operating.

In one embodiment the hardware control circuit further includes a second target voltage above the controlled level to which the hardware control circuit controls the DC voltage when the battery is removed from the UPS. Further, the microprocessor control circuit begins commanding the hardware control circuit to control the DC voltage at the controlled level to charge the battery when a voltage on the internal DC bus is sufficient for the microprocessor control circuit to wake up. In one embodiment, this voltage level is approximately 80 volts. In an embodiment of the present invention, the circuit also includes a kick-start circuit operative upon initial application of AC mains power to the UPS to start the input controlled rectifier and enable the hardware control circuit if no batteries are in the system or if they are severely discharged. Preferably, the hardware control circuit includes a second control loop having a maximum voltage level to which the hardware control circuit limits the DC voltage in case of failure.

In a further embodiment of the present invention, the microprocessor control circuit provides a variable duty cycle control signal to the hardware control circuit to command control of the DC voltage. The hardware control circuit controls the DC voltage at the first target voltage when the duty cycle of the variable duty cycle control signal is less than approximately 10%, at a second target voltage above the controlled level when the duty cycle of the variable duty cycle control signal is greater than approximately 10%, and at a level between the first safe level and the second level when the duty cycle of the variable duty cycle control signal is between approximately 10% and 75%. The duty cycle is 0% when the microprocessor control circuit is not awake. The duty cycle is approximately equal to 10% when the microprocessor is awake and the battery is removed from the UPS. When the duty cycle is greater than approximately 75%, the converters are shut down.

A method of starting an uninterruptible power supply (UPS) having severely discharged batteries upon connection of AC mains power is also presented. The UPS includes an input controlled rectifier capable of generating a controlled DC voltage on an internal DC bus, and a hardware control circuit and a microprocessor control circuit for controlling the input controlled rectifier. The method includes the step of controlling the input controlled rectifier by the hardware control circuit to generate a DC voltage on the internal DC bus at a level below a normally controlled voltage. This step begins the charging of the batteries. The method also includes the step of controlling the input controlled rectifier by the microprocessor control circuit to generate the DC voltage on the internal DC bus at the normally controlled voltage when the internal DC bus reaches a level sufficient for the microprocessor control circuit to wake up.

In one embodiment the step of controlling the input controlled rectifier to generate the DC voltage on the internal DC bus at the normally controlled voltage comprises the step of providing by the microprocessor control circuit a variable duty cycle control signal to the hardware control circuit. The hardware control circuit adjusts a voltage level of the input controlled rectifier in response to a variation in a duty cycle of the variable duty cycle control signal. The method also preferably includes the step of controlling the input controlled rectifier by the hardware control circuit to generate the DC voltage on the internal DC bus at a second level above the normally controlled voltage when the battery is removed from the UPS. In one embodiment, the method includes the step of controlling the input controlled rectifier by a second control loop of the hardware control circuit to not exceed a maximum voltage level.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
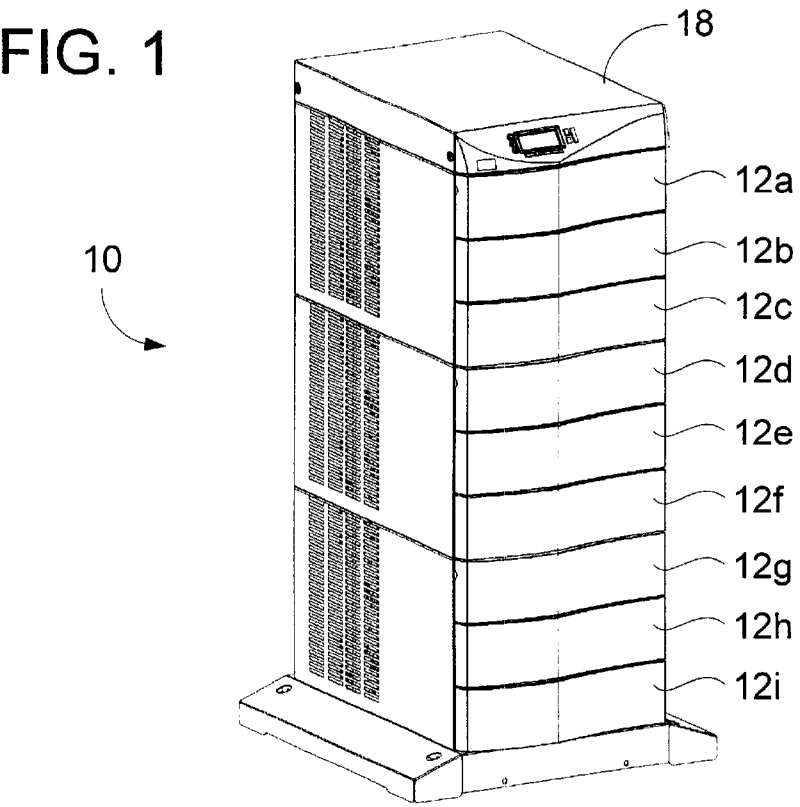
FIG. 1 is an isometric illustration of an embodiment of an uninterruptible power supply (UPS) system constructed in accordance with the teachings of the present invention.
Figure 2:
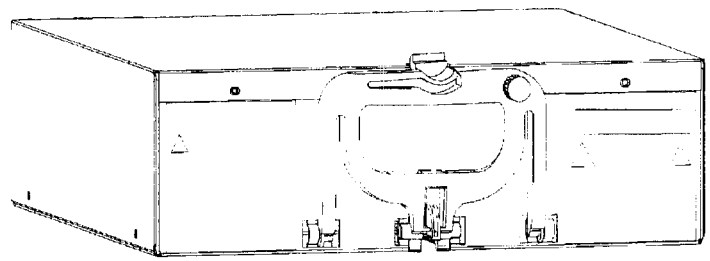
FIG. 2 is an isometric illustration of a power module useful in the UPS system of FIG. 1 and constructed in accordance with the teachings of the present invention.
Figure 3:
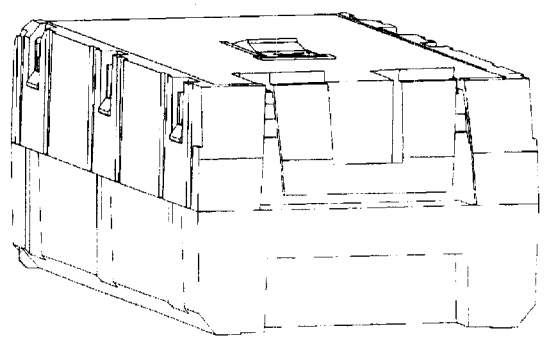
FIG. 3 is an isometric illustration of a battery pack useful in the UPS system of FIG. 1 and constructed in accordance with the teachings of the present invention.

An embodiment of the modular uninterruptible power supply (UPS) system 10 of the present invention is illustrated in FIG. 1. In this embodiment, the UPS 10 is illustrated with 9 slots 12a–12i, although more or fewer slot configurations are also possible and within the scope of the modular UPS of the present invention. Each of the slots 12 of the UPS 10 is adapted to accommodate the installation of either a power module 14 as illustrated in FIG. 2, or battery packs 16 as illustrated in FIG. 3. In a preferred embodiment, the battery packs 16 are sized to aid in their installation and removal from the slots 12 of the UPS 10. That is, the battery packs 16 are packaged such that two packs may be accommodated in a single slot 12 of the UPS 10. The battery packs 16 in each slot are preferably coupled in series, and in parallel with the other series connected battery packs of other slots, if any. One skilled in the art will recognize, however, that other physical configurations of the batteries are possible, and are within the scope of the present invention. The UPS also includes an operator control panel 18 that is used to display system information and allow user input to the UPS 10.

The individual power modules 14 illustrated in FIG. 2 may be inserted in any slot 12 of the UPS 10, and allow flexibility in the configuration of the UPS 10. This flexibility allows the UPS 10 to grow and change with the business, as their power needs develop. Each power module is identical in construction, including all of the control functions necessary to allow the various modules to operate as a single coordinated unit, regardless of how many power modules 14 and batteries are installed in the UPS 10. Unlike other UPS systems, the functionality provided by the power modules 14 allows the UPS system 10 to operate as a line conditioner without any batteries at all installed. In this way, the utilization equipment coupled to the system 10 will receive electric power that has been conditioned to remove harmonic distortion, voltage droops, spikes, etc. In a high efficiency mode, minimal conditioning is provided to increase to efficiency of power transfer through the UPS 10.

Figure 4:
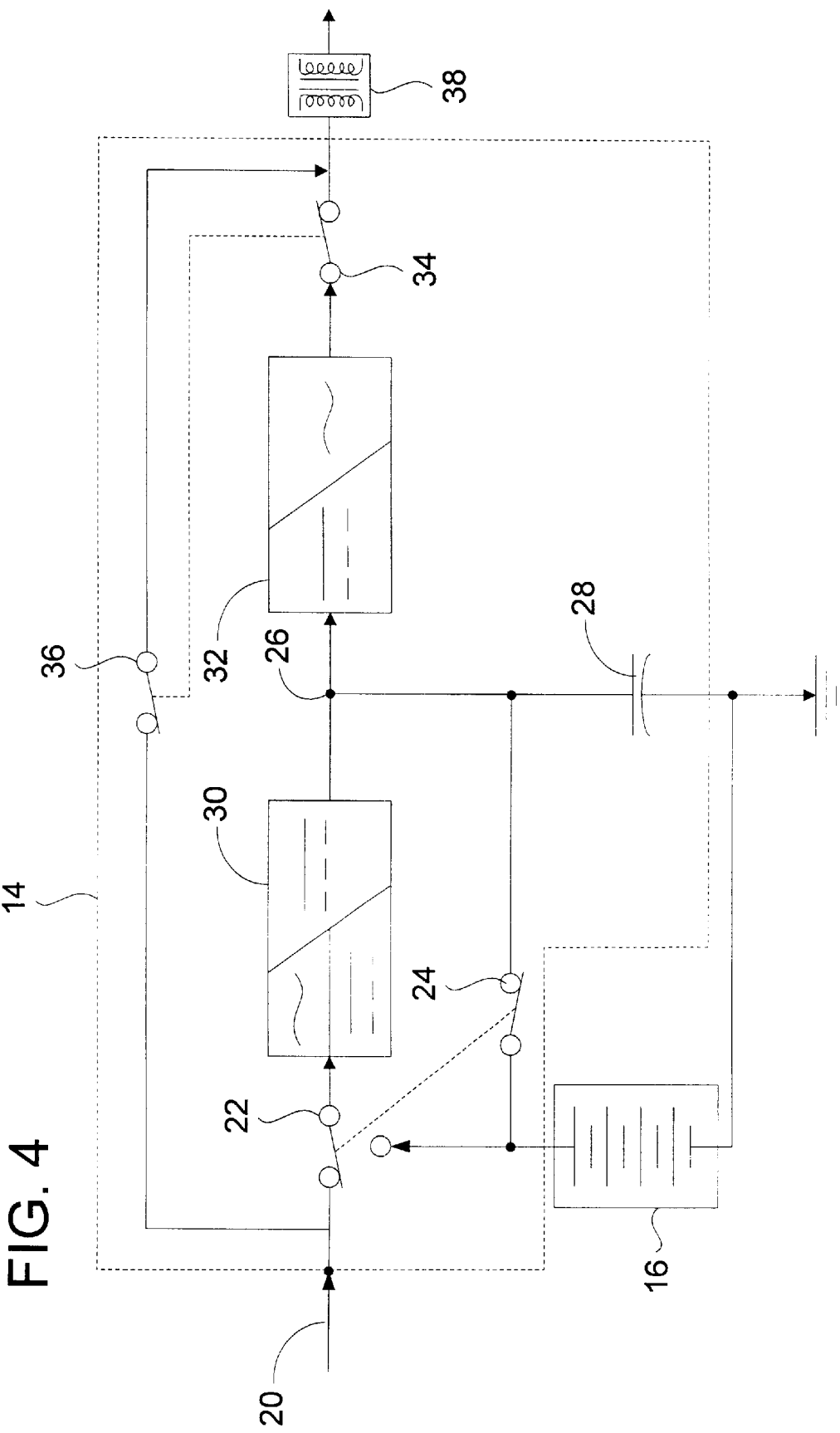
FIG. 4 is a simplified functional block diagram of the system of the present invention.

To better understand the functionality of the UPS 10, reference is now made to the functional block diagram of FIG. 4. In this simplified illustration the basic functional internal components of the power module 14 are shown. The input line voltage from the utility (mains) 20 is input to the power module 14, as is the voltage from the battery 16. An input selector relay 22 selects the proper one of these two inputs to be used to supply the utilization equipment depending on the operating mode of the UPS. This input selector relay 22 also controls a contact 24 that controls the connection of the battery 16 to the DC bus 26 and the DC capacitor bank 28 during charging operation as will be described in more detail below.

The input power, whether AC from the utility mains 20 or DC from the battery 16, is coupled to an input controlled rectifier 30. This controlled rectifier 30 generates a controlled DC voltage on the DC bus 26 to charge the DC capacitor bank 28. This DC voltage stored by the DC capacitor bank 28 is used by the power inverter 32 to generate the output AC voltage waveform supplied to the utilization equipment. An internal bypass circuit disconnects the conversion equipment (30, 32) from the output via relay contact 34 and connects the input from the mains 20 to the output via relay contact 36. As illustrated, an output isolation transformer 38 may be provided if desired.

Figure 5:
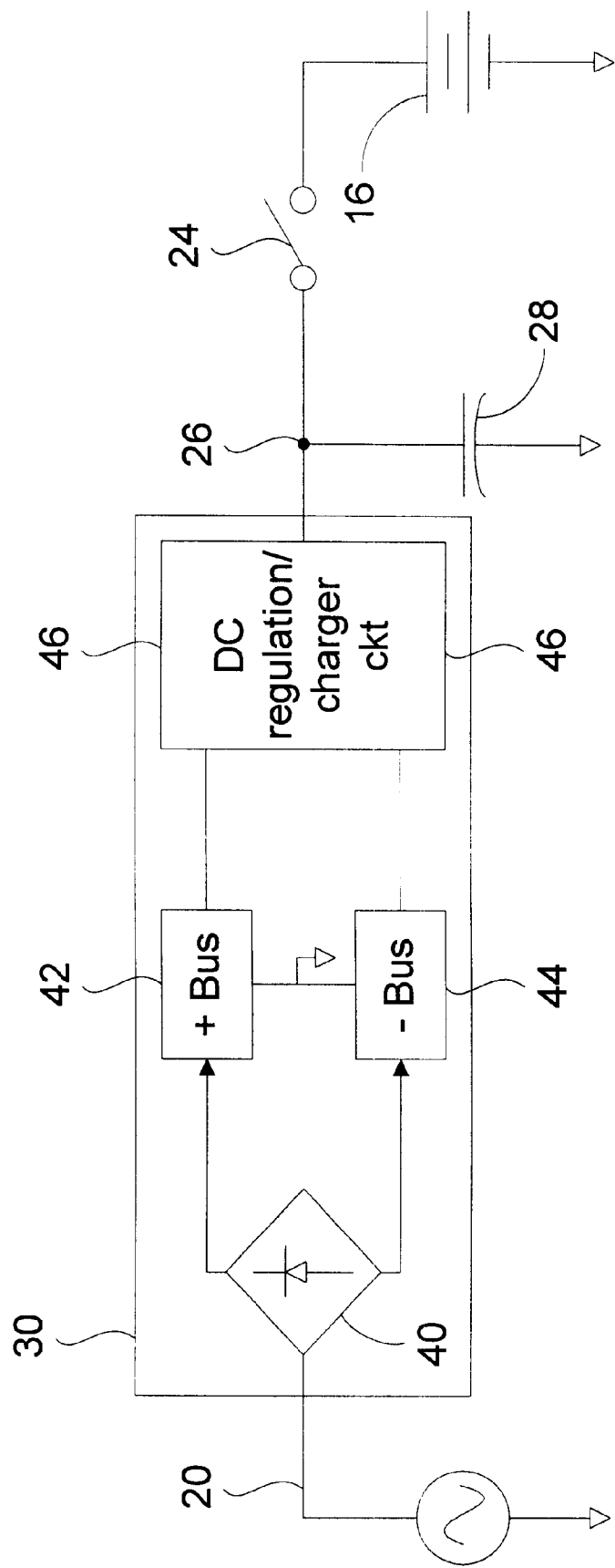
FIG. 5 is a simplified functional block diagram illustrating the battery charging functionality of the present invention.

Turning now specifically to the functionality of the controlled rectifier 30 during operation with input AC power from the mains 20, reference is now made to FIG. 5. The input AC power is first rectified by a bridge rectifier 40 to form a +DC bus 42 and a –DC bus 44. These two DC busses 42, 44 are input to a DC regulation/charger circuit 46 that controls the output DC voltage supplied to the DC bus 26.

During normal operation with AC mains 20 available, this circuitry 46 also provides trickle charging of the batteries 16 if installed in the UPS 10. This functionality is provided by a current mode control loop. If no batteries are installed, the DC regulation/charger circuitry 46 simply maintains the charge on the DC capacitor bank 26. Without the batteries installed the regulation of the DC bus 26 voltage requires that the DC regulation/charger circuitry 46 utilize a fast voltage mode control loop.

Figure 6:
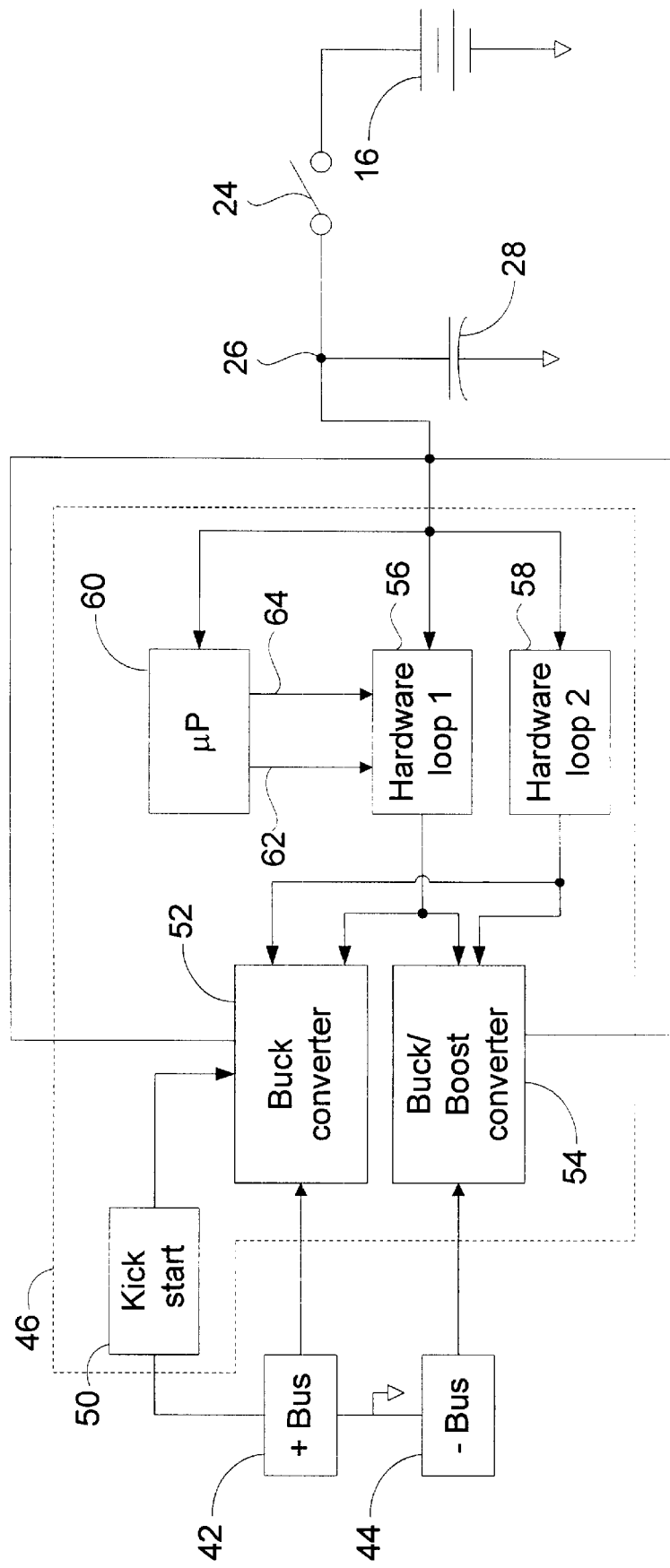
FIG. 6 is a simplified charger control block diagram of the system of the present invention.

This DC regulation/charger circuit 46 is illustrated in greater detail in FIG. 6. Conventional kick-start circuitry 50 is coupled to the +DC bus 42 to start the buck converter 52, which is also coupled to the +DC bus 42, in the event that no housekeeping power is available (e.g., initial start up with dead or no batteries installed). Power from the −DC bus 44 is utilized through a buck/boost converter 54. The outputs from these two converters 52, 54 are utilized to maintain the output DC bus 26 voltage. If batteries 16 are installed, this output DC voltage provides charging of the batteries to achieve and maintain a ready state should the AC mains experience a degradation or failure. If the batteries are disconnected via relay 24 or are simply not installed, the converters 52, 54 maintain the charge on the DC capacitor bank 28 alone.

The control for this DC regulation is accomplished via both hardware 56, 58 and microprocessor 60 control loops. These various control loops 56, 58, 60 each monitor the DC bus 26 voltage to ensure proper control. Upon initial start-up with dead batteries once the kick-start circuit 50 has started the buck converter 52, the control of the output DC voltage is accomplished by the first hardware control loop 56 operating with a first target voltage. Specifically, since the microprocessor 60 has not yet had a chance to wake up, the hardware control loop 56 operates the converter 52 based on its internal target voltage. This initial control voltage target is set below the typical controlled float charge voltage to ensure the safe initial charging of the batteries until the microprocessor can assume control. Preferably, this voltage level is set to approximately 126 volts. At this level, even if the microprocessor control fails to wake up the batteries will not be overcharged, and the system will remain safe. In addition to providing a safe level of charging, this voltage level set point allows other power modules in the system that may be operating under microprocessor control to charge the batteries fully. Once the batteries have charged to a sufficient level to power the housekeeping circuitry (80 volts in one embodiment), the microprocessor 60 can take over regulation of the DC bus 26 and charging of the batteries 16. Once this housekeeping power is available, converter 54 will aid in regulating the DC bus 26 and charging of the batteries 16.

When the microprocessor 60 initially wakes up, it commands the hardware control loop 56 to turn the chargers full on via line 62. In one embodiment this control line 62 carries a variable duty cycle control signal from the microprocessor 60. The hardware control circuitry 56 adjusts the regulation set point based on the presence and duty cycle of this signal. For example, when the microprocessor is not operating, the duty cycle of this signal is zero. This allows the hardware control loop 56 to operate at its internal target voltage of approximately 126 volts. However, when the microprocessor 60 is functioning and wishes to adjust the voltage regulation point, it simply adjusts the duty cycle of the signal on line 62. If no batteries 16 are installed in the system, or if relay 24 is open, then the duty cycle of the signal on line 62 is set to approximately 10%. This changes the regulation target set point within the hardware control loop 56 to its maximum set point. This allows the fast hardware voltage mode control to better regulate the DC bus 26 with only the capacitor bank 28 connected thereto. In one embodiment, this maximum voltage target set point is approximately 160 volts. This fast DC bus control enables hot swapping of the batteries within the UPS 10. That is, a user may remove, replace, or reconfigure the batteries within the UPS during operation with line power available without adverse effect.

Once the voltage on the DC bus 26 begins to rise as the batteries are charged, the microprocessor begins to increase the duty cycle of the control signal on line 62 to decrease the set point of the hardware control loop 56. In accordance with a battery charging profile, the microprocessor 60 eventually commands a regulation set point (target) of approximately 133 volts via line 62. The hardware control circuitry 56 then is able to maintain a float charge on the batteries 16. As the demand from the inverter 32 (FIG. 4) varies the DC bus 26 voltage, the microprocessor varies the duty cycle of the control signal on line 62 between the hardware full on setting of approximately 10% and the hardware off setting of approximately 75%.

The microprocessor 60 also provides a safety shut down signal on line 64. When activated, the hardware control loop 56 shuts down operation of the converters 52, 54. This signal 64 is the primary mechanism used by the microprocessor 60 to shut down the converters 52, 54. However, the setting of the duty cycle of signal 62 at or above approximately 75% can also turn off the converters 52, 54 as discussed briefly above. A second hardware control loop 58 is also provided in an embodiment of the present invention. This second hardware control loop 58 ensures a maximum output voltage from the converters 52, 54 is not exceeded. In this way, any failure of the regulation from either of the microprocessor 60 or the first hardware control loop 56 that would attempt to generate a voltage greater than a predetermined maximum limit would be overridden by this second hardware control loop 58. In one embodiment, this maximum over voltage limit is set to approximately 180 volts.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An uninterruptible power supply (UPS) system, comprising a power module having an input adapted to receive AC mains power, and an output adapted to supply AC power to utilization equipment, the power module having an input controlled rectifier adapted to generate a DC voltage on an internal DC bus and a power inverter coupled to said internal DC bus for generating said AC power on said output, said power module including a hardware control circuit having a first control loop adapted to control said input controlled rectifier to regulate said DC voltage on said internal DC bus at a first safe level below a normal controlled level.

2. The UPS system of claim 1, wherein said power module further comprises a microprocessor control circuit operatively coupled to said hardware control circuit to control said DC voltage on said internal DC bus at said normal controlled level.

3. The UPS system of claim 2, wherein said microprocessor control circuit provides a variable duty cycle control signal to said hardware control circuit, said microprocessor adjusting a duty cycle of said variable duty cycle control signal to vary said DC voltage on said internal DC bus.

4. The UPS system of claim 3, wherein said hardware control circuit controls said DC voltage at said first safe level when said duty cycle of said variable duty cycle control signal is less than approximately 10%, wherein said hardware control circuit controls said DC voltage at a second level above said normal controlled level when said duty cycle of said variable duty cycle control signal is approximately 10%, wherein said hardware control circuit controls said DC voltage at a level between said first safe level and said second level when said duty cycle of said variable duty cycle control signal is between approximately 10% and 75%.

5. The UPS system of claim 2, further comprising a slot adapted to receive a battery, and wherein said microprocessor commands said hardware control circuit to control said DC voltage at a second level above said normal controlled level when no battery is present in said slot.

6. The UPS system of claim 2, further comprising a battery selectively coupled to said input of said controlled rectifier and to said internal DC bus, and wherein said microprocessor commands said hardware control circuit to control said DC voltage at said normal controlled level to charge said battery.

7. The UPS system of claim 6, wherein said microprocessor control circuit commands said hardware control circuit to control said DC voltage to a second level above said normal controlled level upon removal of said battery.

8. The UPS system of claim 2, wherein said hardware control circuit includes a second control loop operative to control said DC voltage below a maximum level.

9. The UPS system of claim 2, further comprising a battery selectively coupled to said input of said controlled rectifier and to said internal DC bus, and wherein said hardware control circuit is operative to control said DC voltage at said first safe level to charge said battery until said microprocessor wakes up, and wherein said microprocessor controls said hardware control circuit to control said DC voltage at said normal controlled level to charge said battery.

10. The UPS system of claim 9, wherein said microprocessor commands said hardware control circuit to control said DC voltage at a second level upon removal of said battery.

11. The UPS system of claim 1, further comprising a kick-start circuit operative upon initial application of AC mains power to start said input controlled rectifier.

12. A battery charger control circuit for use in an uninterruptible power supply (UPS) having an input controlled rectifier adapted to supply DC power to an internal DC bus for use by a power inverter to generate output AC power, the input controlled rectifier selectively utilizing AC mains power and battery power to supply the DC power to the internal DC bus, the battery being coupled to the DC bus to receive charging power therefrom when not selectively coupled to the input controlled rectifier to supply power thereto, comprising:

a hardware control circuit operatively coupled to the input controlled rectifier to control a DC voltage supplied thereby; and a microprocessor control circuit receiving power from the internal DC bus, said microprocessor control circuit operatively coupled to said hardware control circuit to command said hardware control circuit to control said DC voltage from the input controlled rectifier at a controlled level; and wherein said hardware control circuit includes a first control loop having a first target voltage below said controlled level to which said hardware control circuit controls said DC voltage when said microprocessor control circuit is not operating.

13. The circuit of claim 12, wherein said hardware control circuit further includes a second target voltage above said controlled level to which said hardware control circuit controls said DC voltage when the battery is removed from the UPS.

14. The circuit of claim 12, wherein said microprocessor control circuit begins commanding said hardware control circuit to control said DC voltage at said controlled level to charge the battery when a voltage on said internal DC bus is sufficient for said microprocessor control circuit to wake up.

15. The circuit of claim 12, further comprising a kick-start circuit operative upon initial application of AC mains power to the UPS to start the input controlled rectifier and enable said hardware control circuit.

16. The circuit of claim 12, wherein said hardware control circuit includes a second control loop having a maximum voltage level to which said hardware control circuit limits the DC voltage in case of failure.

17. The circuit of claim 12, wherein said microprocessor control circuit provides a variable duty cycle control signal to said hardware control circuit to command control of said DC voltage, and wherein said hardware control circuit controls said DC voltage at said first target voltage when said duty cycle of said variable duty cycle control signal is less than approximately 10%, wherein said hardware control circuit controls said DC voltage at a second target voltage above said controlled level when said duty cycle of said variable duty cycle control signal is approximately 10%, and wherein said hardware control circuit controls said DC voltage at a level between said first safe level and said second level when said duty cycle of said variable duty cycle control signal is between approximately 10% and 75%.

18. The circuit of claim 17, wherein said duty cycle is less than 10% when said microprocessor control circuit is not awake.

19. The circuit of claim 17, wherein said duty cycle is set to approximately 10% when said microprocessor is awake and the battery is removed from the UPS.

20. A method of starting an uninterruptible power supply (UPS) having severely discharged batteries upon connection of AC mains power, the UPS including an input controlled rectifier capable of generating a controlled DC voltage on an internal DC bus, the UPS further including a hardware control circuit and a microprocessor control circuit for controlling the input controlled rectifier, comprising the steps of:

controlling the input controlled rectifier by the hardware control circuit to generate a DC voltage on the internal DC bus at a level below a normally controlled voltage to begin charging the batteries;

controlling the input controlled rectifier by the microprocessor control circuit to generate the DC voltage on the internal DC bus at the normally controlled voltage when the internal DC bus reaches a level sufficient for the microprocessor control circuit to wake up.

21. The method of claim 20, wherein said step of controlling the input controlled rectifier to generate the DC voltage on the internal DC bus at the normally controlled voltage comprises the step of providing by the microprocessor control circuit a variable duty cycle control signal to the hardware control circuit, and adjusting a voltage level of the input controlled rectifier by the hardware control circuit in response to a variation in a duty cycle of the variable duty cycle control signal.

22. The method of claim 20, further comprising the step of controlling the input controlled rectifier by the hardware control circuit to generate the DC voltage on the internal DC bus at a second level above the normally controlled voltage when the battery is removed from the UPS.

23. The method of claim 20, further comprising the step of controlling the input controlled rectifier by a second control loop of the hardware control circuit to not exceed a maximum voltage level.

* * * * *